US011037220B2

(12) United States Patent
Westphal

(10) Patent No.: US 11,037,220 B2
(45) Date of Patent: Jun. 15, 2021

(54) SYSTEMS AND METHODS FOR PROVIDING SEARCH RESULTS INCORPORATING SUPPLY CHAIN INFORMATION

(71) Applicant: W.W. GRAINGER, INC., Lake Forest, IL (US)

(72) Inventor: Geoffry A. Westphal, Evanston, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 134 days.

(21) Appl. No.: 13/796,681

(22) Filed: Mar. 12, 2013

(65) Prior Publication Data

US 2014/0279248 A1    Sep. 18, 2014

(51) Int. Cl.
*G06Q 30/06* (2012.01)
*G06Q 30/02* (2012.01)

(52) U.S. Cl.
CPC ..... *G06Q 30/0625* (2013.01); *G06Q 30/0255* (2013.01); *G06Q 30/0623* (2013.01); *G06Q 30/0641* (2013.01)

(58) Field of Classification Search
CPC .......... G06Q 30/0625; G06Q 30/0641; G06Q 30/0623; G06Q 30/0255
See application file for complete search history.

(56) References Cited

U.S. PATENT DOCUMENTS

| 6,853,982 | B2 * | 2/2005 | Smith et al. ................. 705/26.7 |
| 8,165,923 | B2 * | 4/2012 | Bezos et al. ............... 705/26.61 |
| 8,364,695 | B2 * | 1/2013 | Berkowitz et al. ........... 707/768 |
| 8,484,179 | B2 * | 7/2013 | Tran et al. .................... 707/706 |
| 8,538,836 | B1 * | 9/2013 | Scott et al. ................. 705/27.2 |
| 2006/0026147 | A1 * | 2/2006 | Cone .................. G06F 16/9535 |

OTHER PUBLICATIONS

Javnozon et al., "Search Refinement Using Contextual Choices" IP.com Prior Art Database Technical Disclosure. Apr. 2, 2009. https://ip.com/IPCOM/000181468 (Year: 2009).*

* cited by examiner

*Primary Examiner* — Michelle T Kringen
*Assistant Examiner* — Lance Y Cai
(74) *Attorney, Agent, or Firm* — Greenberg Traurig, LLP

(57) ABSTRACT

A systems and methods for providing a search refinement tools that incorporate contextual information, such as supply chain information is disclosed. In general, the example methods and systems provide the customer with the ability to refine search results on an e-commerce website using previously stored historical supply chain information. Supply chain information refers to historical information about a purchaser and the purchaser's previous purchases.

6 Claims, 4 Drawing Sheets

SYSTEMS AND METHODS FOR PROVIDING SEARCH RESULTS INCORPORATING SUPPLY CHAIN INFORMATION

FIELD OF THE DISCLOSURE

The present description relates generally to systems and methods for providing search results incorporating supply chain information.

BACKGROUND OF RELATED ART

Currently, commerce suppliers and/or e-commerce related websites, whether business to business (B2B) or business to consumer (B2C), provide methods for a customer to search and navigate inventory. In particular, e-commerce websites commonly provide a variety of search options, which allow customers to search for products in a variety of ways, including for example, keyword searching, searching using unique product identifiers (e.g., a catalog number, ordering number, inventory number, StockKeeping Unit (SKU), etc.), model number searching, competitor model number searching, manufacturer name searching, and searching via selection guides. Additionally, prior art e-commerce websites often provide ways to refine and/or filter existing search results, including refining or filtering based on product category, brand, price range, and/or any other appropriate criteria.

Notably, a customer may search for and/or purchase the same product repeatedly as a part of a larger, repeated process, such as a supply chain. For example the users search and/or purchase may be a part of an organization's sourcing, procurement, manufacturing, conversion, and/or logistics management process. By its nature, a supply chain process may be repeated, refined and/or reproduced. Thus, a customer may periodically search for and/or purchase the same product(s) on an e-commerce website as a part of a larger supply chain process, for example as a replacement or maintenance part, for a reiterative process/project, for a repeat customer, etc.

While existing searching capabilities are sometimes sufficient for finding the product, existing search refinement systems fail to provide an intuitive search process that is keyed to a user's historical context, such as the broader supply chain that the search is a part of. In particular, existing search capabilities do not incorporate supply chain information, such as a user's previous purchasing history, shipping history, personal organizational lists, and other user information that may be collected by an organization with an e-commerce website.

Thus, while the background systems and methods identified herein, generally work for their intended purpose, the subject invention provides improvements thereto, particularly by providing a system that collects supply-chain information about a customer's preferences and purchase history, and incorporates this information in the search refinement parameters displayed in future product search results.

BRIEF DESCRIPTION OF THE DRAWINGS

For a better understanding of the present disclosure, reference may be had to various examples shown in the attached drawings.

DETAILED DESCRIPTION

Figure 1:
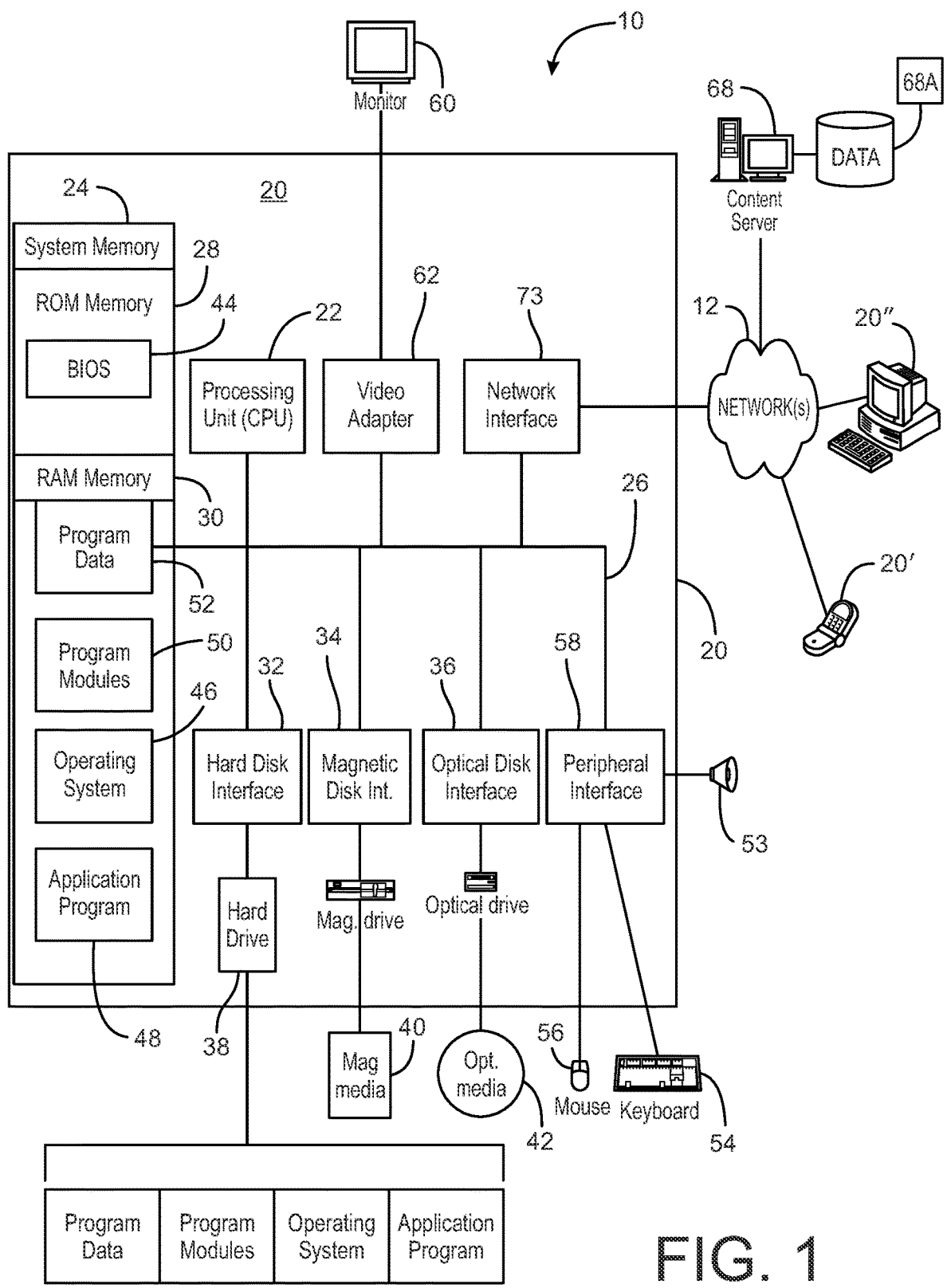
FIG. 1 illustrates in block diagram form components of an example, computer network environment suitable for implementing example cross referencing systems disclosed.

The following description of example methods and apparatus is not intended to limit the scope of the description to the precise form or forms detailed herein. Instead the following description is intended to be illustrative so that others may follow its teachings.

The following discloses systems and methods for providing a search refinement tool that incorporates contextual information, such as supply chain information. In general, the example methods and systems provide the customer with the ability to refine search results on an e-commerce website using previously stored historical supply chain information. Supply chain information refers to historical information about and/or specifically related to a purchaser, including for example, data related to a user's previous purchasing history, shipping history, payment history, personal organizational lists, product information about previously purchased products including parts listings, power ratings, brand information, compatibility information, and/or any other information that may be collected by and/or provided to an e-commerce website.

The disclosed examples use supply chain information to provide search refinement and/or filtering parameters for customers using the e-commerce website. For example, a user may conduct an initial search, e.g. via keyword searching, searching using unique product identifiers (e.g., a catalog number, ordering number, inventory number, StockKeeping Unit (SKU), etc.), model number searching, competitor model number searching, manufacturer name searching, searching via selection guides, etc. The disclosed system then provides supply-chain search refinement parameters which allow users to narrow search results to show only, for example (i) previously purchased items; (ii) items purchased on a particular date; (iii) items shipped to a particular address; (iv) items paid for using a particular payment method; (v) items compatible with a previously purchased product; (vi) replacement parts approved for use in association with a previously purchased product; (vii) items listed on a customer's personal organizational list; (viii) items associated with a particular client; (ix) items associated with a particular project; and/or any other suitable parameter.

The disclosed example systems and methods provide for a simplified user interface to assist a customer in finding and/or selecting the correct, or most suitable, product(s). It will be appreciated by one of ordinary skill in the art that there are numerous interface conventions to provide search refinement capabilities based on supply chain information. For instance, by way of example only, each of the supply-chain search refinement parameters may be displayed on a side-bar, a pop-up, a nested list, a map, and/or listed beside each search result. The customer may select and/or otherwise choose a narrowing supply-chain search refinement parameter, which causes the e-commerce website to only display search results that are related to the selected search parameter.

With reference to the figures, and more particularly, with reference to FIG. 1, the following discloses various example systems and methods for providing search results based on supply chain information on a computer network, such as a personal computer or mobile device. To this end, a processing device 20", illustrated in the exemplary form of a mobile communication device, a processing device 20', illustrated in the exemplary form of a computer system, and a processing device 20 illustrated in schematic form, are provided with executable instructions to, for example, provide a means for a customer, e.g., a user, client, corporate shopper, buyer, consumer, etc., to access a host system server 68 and, among other things, be connected to a hosted vendor purchasing system, e.g., a website, mobile application, etc. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, a personal computer, a mainframe computer, a personal-digital assistant ("PDA"), a cellular telephone, a mobile device, a tablet, an e-reader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules, and other data for the processing device 20. Those of ordinary skill in the art will further appreciate that other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. The example data repository 68A may include any suitable vendor data including, for example, customer/company information, electronic catalog pages, inventor, etc. In this example, the data repository 68A includes a listing of a plurality of products that are available for purchase, and historical records related to a user. A user's historical records may include, for example, a user's previous purchasing history, shipping history, payment history, searching history, personal organizational lists, product information about previously purchased products including parts listings, power ratings, brand information, compatibility information, and any other information that may be collected by an e-commerce website. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services, systems of shipping/delivery companies, systems related to geographical or mapping information, systems providing product information, etc.

For performing tasks as needed, the host system server 68 may include many or all of the elements described above relative to the processing device 20. In addition, the host system server 68 would generally include executable instructions for, among other things, storing contextual supply chain information, providing search refinement parameters related to supply chain information, facilitating the display and selection of supply chain search refinement parameters, providing access to product purchasing, etc.

Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
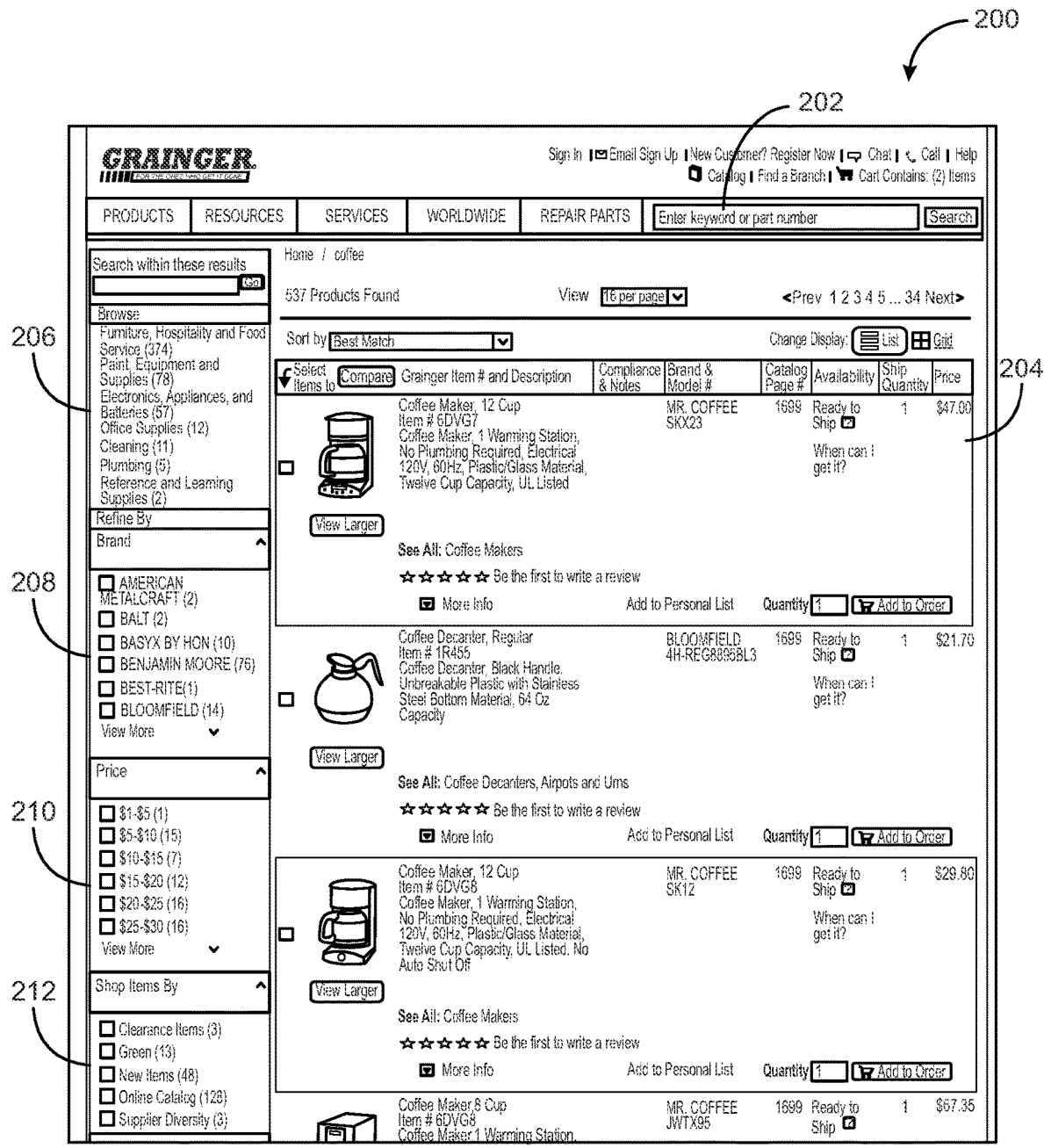
FIG. 2 illustrates an example page of a prior art product search system that provides search results.

FIG. 2 illustrates a prior art webpage 200 demonstrating prior art search refinement parameters. In this webpage 200, a customer generally interacts with the host system server 68 to search for and order/purchase goods of interest. To facilitate this process, the host system server 68 provides access to various product ordering input methods, including, for example, a single item input, a bulk ordering pad, and/or a list importation method that is made conveniently accessible on a page, such as a mobile application page, webpage, etc. displayed on the client computing device. Specifically, as illustrated in the prior art example, the webpage 200 provides an access point 202 presented in the form of a text box, by which the customer may enter a search term, for example, a keyword, a unique product identifier (e.g., a catalog number, ordering number, inventory number, Stock-Keeping Unit (SKU), etc.), a model number, a manufacturer name, a competitor manufacture name, product guide selections etc. In the prior art example of webpage 200, a customer enters any suitable search term in access point 202 to initiate an initial search.

Upon the server 68 performing the initial search in the data repository 68A, the server 68 returns all matched and/or closely related search results to the window 204. For instance, in the example of FIG. 2, the search results are all related to coffee makers. The search results window 204 provides detailed information about each search result including, product name, manufacturer name, availability, price, product specifications, catalog location, and/or any other appropriate product information.

The prior art webpage 200 further allows users to refine the initial search results based on certain parameters using the search refinement windows 206, 208, 210, 212. Specifically, in the illustrated example, the window 206 allows users to refine the initial search results based on product category; the window 208 allows users to refine the search results by brand; the window 210 allows users to refine the search results by price range; and the window 212 allows users to refine the search results by special features, (namely, clearance items, "green" items; new items, items from the online catalog, and items that are representative of supplier diversity). As demonstrated, none of the prior art search parameters illustrated in search refinement windows 206, 208, 210, 212 incorporate any contextual, historical, or supply-chain information related to the user.

Figure 3:
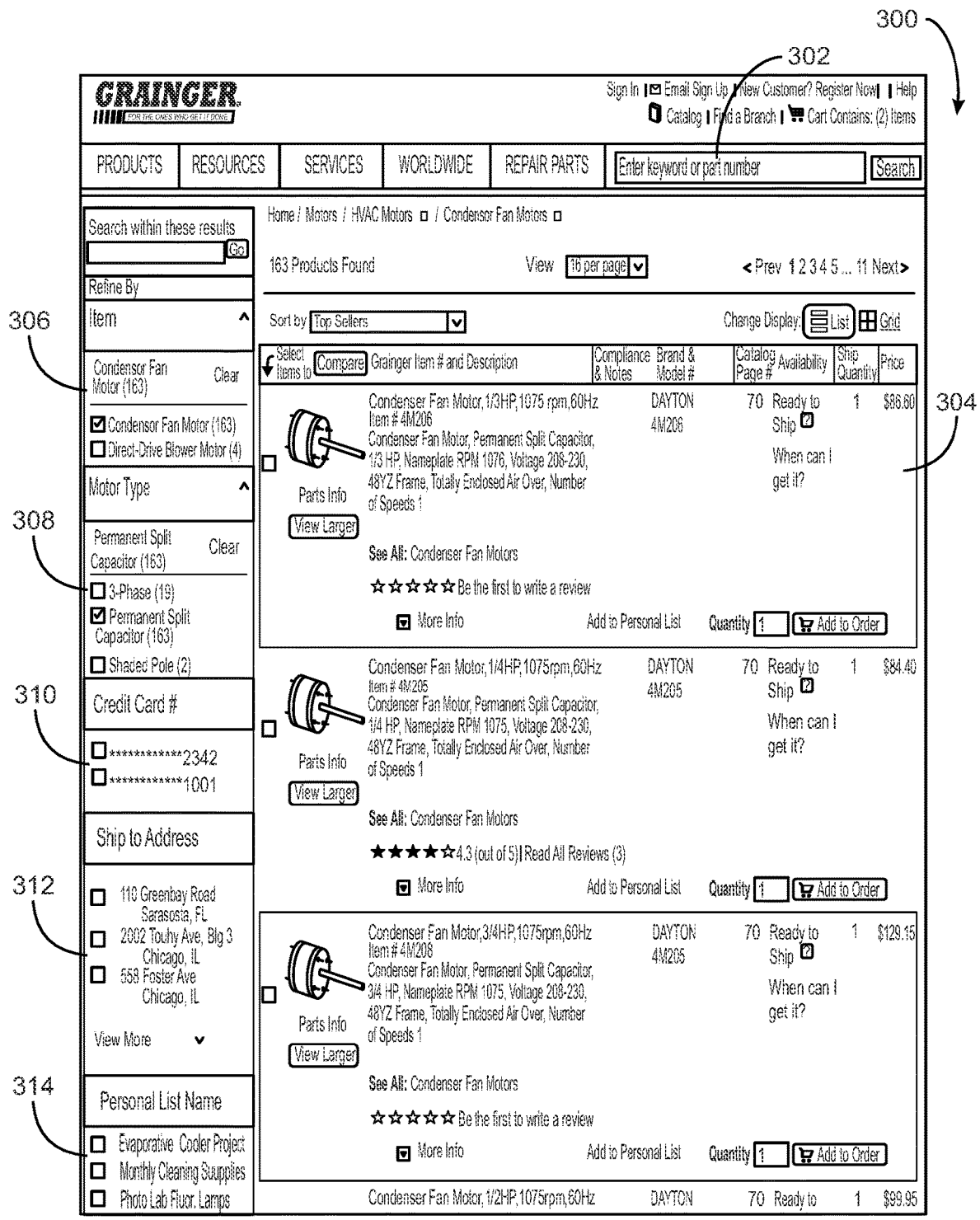
FIG. 3 illustrates an example page that provides search results that incorporates supply-chain information in accordance with the present disclosure.

FIG. 3 illustrates an example webpage 300 in accordance with the disclosed supply-chain search refinement framework 100. In the illustrated example of FIG. 3, a customer may enter any suitable initial search term in an access point 302. In the illustrated example of FIG. 3, the access point 302 is a text box, however, one of ordinary skill the art will recognize that the access point 302 may also be a hyperlink, radio button, check box, input field, drag-and-drop receptacle, and/or any other appropriate input mechanism. It will also be appreciated that the form, location, etc., of the access point 302 may be displayed and/or vary as desired by design, and/or by display type (e.g., mobile device, personal computer, tablet, etc.). Still further, the type and/or manner of inputting the order information may be any suitable entry method including text, voice, picture, scanner, motion, etc.

Triggering the initial search will cause the system host server 68 to look-up of the entered search in the data repository 68A, and return multiple matched and/or closely related search results to a window 304. It will be appreciated that the triggering event to perform the look-up of the item number in the data repository 68A may be caused by any suitable action, including for example, a change in the user interface focus, an activation of the access point by being clicked on, moused over, touched, and/or otherwise selected, a time delay, a real-time look-up, near real-time look-up, and/or any other suitable event trigger.

The search result window 304 provides the customer with information related to each search result, including, product name, manufacturer name, availability, price, product specifications, catalog location, and/or any other appropriate product information. In this case, the search result the window 304 displays search results related to various motors. It will be appreciated that the system may provide any suitable product information including, for instance, a membership reward, a vendor item number, a discount, a manual, customer rating, compatibility information, energy rating, etc. Still further, the information provided in the search result window 204 may include links, pages, and/or other methods of providing additional information regarding the product as desired, such as a browse and/or other "look-up" button, a further pop-up, etc. In at least one example, the additional information causes the system 68 to redirect to a further page, including a page located within the vendor system 68 and/or a further page located within a system of a third party (e.g. another manufacturer).

The example webpage 300 comprises search refinement windows, 306, 308, 310, 312, 314. In this example, the system utilizes prior art search refinement parameters allowing users to refine by item name, as shown in the window 306, and refine by motor type as shown in the window 308.

The example webpage 300 also includes supply-chain search refinement parameters, as shown in windows 310, 312, 314. A user may use the window 310 to refine the search results to show items that were previously purchased using a certain credit card number. In particular, after a user selects a certain credit card listed in the window 310, the system will display only the items that were previously purchased using the selected credit card. One of ordinary skill in the art will recognize that users may use the credit card information to identify certain supply-chain information, such as information about the client that a product was previously purchased for, the department that the product was billed to, the budget that the product is a part of, and or any other appropriate supply chain information. In just one example, if a user wishes to identify a replacement fan motor that was previously purchased for an existing client, the user may use the window 310 to refine the search results so the system only displays fan motors that were previously purchased using that client's credit card. One of ordinary skill in the art will recognize that while the example window 310 only displays the last four digits of the credit card, a system in accordance with the present disclosure may display any additional information such as client name, department name, budget allocation, billing address, cost center number, department number, etc.

A user may use the window 312 to refine the search results based upon shipping address. Here, after user selects an address listed in the window 312, the system will display only the items that were previously purchased and shipped to the selected address. One of ordinary skill in the art will recognize that users may use the displayed shipping addresses to identify certain supply chain information, such as the client that the product, department, project, site location, and/or machine assembly, for which the product was previously purchased. For example, if the user of the webpage 300 wishes to locate a replacement fan motor for a fan motor that was previously purchased and used in a machine assembly at a first location, the user may use the window 312 to refine the search results to only show fan motors that were previously purchased and shipped to the address of the first location. One of ordinary skill in the art will recognize that while the example window 312 only displays the shipping address, a system in accordance with the disclosed framework 100 may also display other related information such as building name, street name, city, zip code, phone number, client name, site name, machine assembly name, project name, etc.

A user may use the window 314 to refine the search results to only show items that are associated with a user's personal list. Here, after user selects an personal list name displayed in the window 314, the framework 100 will display only the items that are associated with the user's personal list. One of ordinary skill in the art will recognize that a personal list may be a to-do list, a list associated with a client, a list associated with a project, a list associated with a vendor, a parts list for an assembly, a list associated with an agenda, and/or any other appropriate organizational list. In this example, if the user of the webpage 300 wishes to locate a fan motor that is associated with a particular project name, the user may use the window 314 to refine the search results base on a parts list associated with that project. One of ordinary skill in the art will recognize that while the example window 312 only displays the personal list name, a system in accordance with the present disclosure may also display other related information such as date the personal list was created, edit date, author's name, etc.

While the example page 300 displays a number of supply-chain based search refinement parameters, one of ordinary skill in the art will recognize that the present disclosure is not limited to those supply-chain based search refinement parameters. For example, other supply-chain based search refinement parameters include, previously purchased items; items purchased on a particular date; items delivered via a particular method (e.g., pick up, delivery, freight, etc.); the name of customer/purchaser; items paid for using a particular payment method (e.g., check, money order, sales account, etc.); items compatible with a previously purchased product; replacement parts approved for use with a previously purchased product; items associated with a particular client; items associated with a particular project; etc. Moreover, one of ordinary skill in the art will recognize that a user may use supply-chain search refinement parameters in a nested fashion, that is a supply-chain refinement parameter may be used after the search results are already refined using one or more refinement parameters (which may be supply-chain based, or non-supply chain based). Further, the framework 100 may only choose to display relevant supply chain refinement parameters. For example if the initial search is refined by date range, framework 100 may only show the supply chain refinement parameters that are relevant to the selected date range (e.g., the framework may not show payment methods that were not used during the selected date range).

Figure 4:
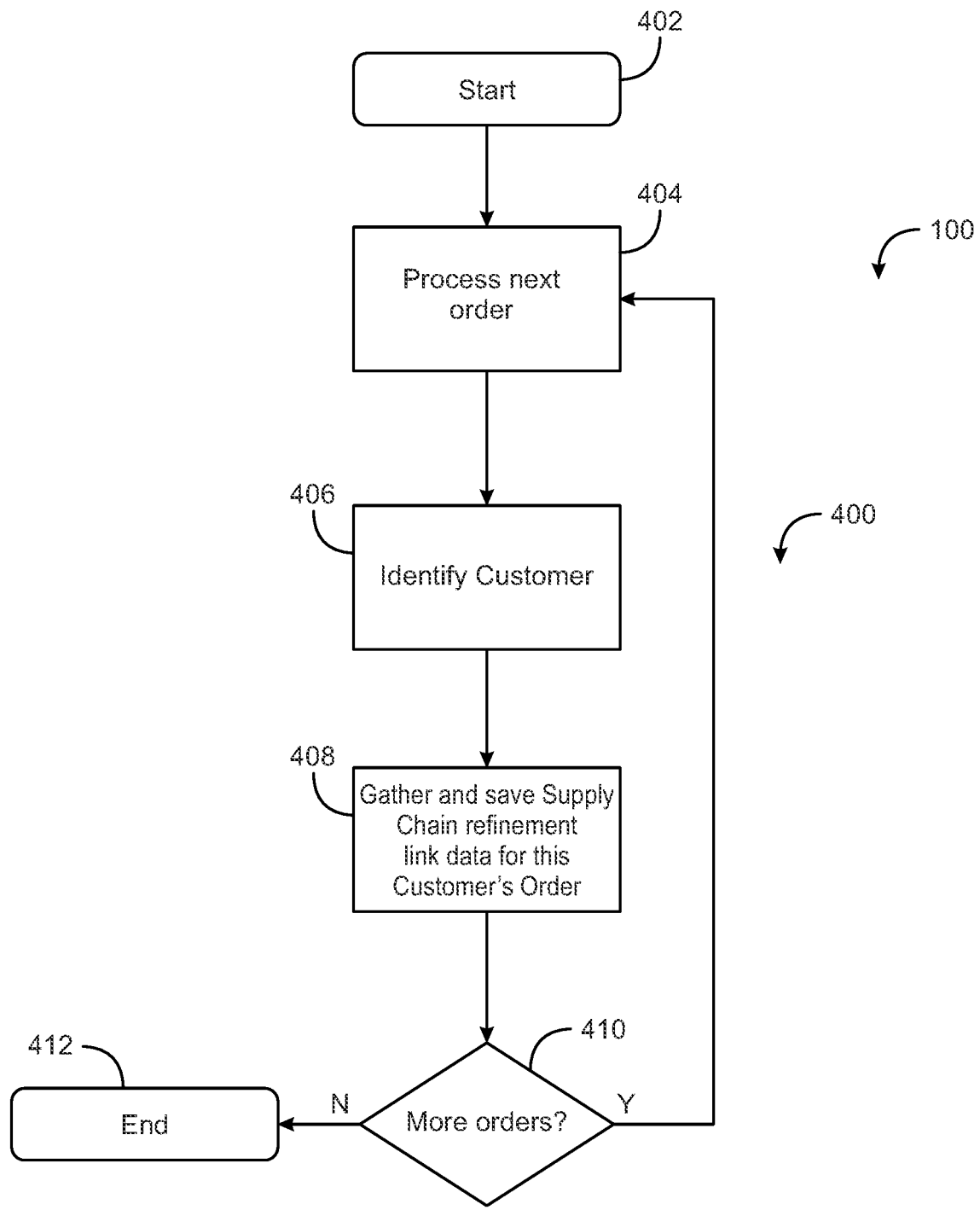
FIG. 4 illustrates in flow chart form a process for providing search results incorporating supply chain information in accordance with the present disclosure.

FIG. 4 is a flow chart that shows an example process 400 for collecting supply-chain information for use in developing supply-chain based search refinement parameters in accordance with the framework 100. As shown, the method is initiated at a block 402, for example, when a user accesses an e-commerce website, a user visits an organization's online catalog, a user logs into a user account, and/or any other appropriate triggering event. At a block 404 the framework 100 processes the next order, which may be, for example, a purchase order, an inventory stock check, and/or any other appropriate order. At a block 406 the framework 100 identifies the customer who is making the order processed at the block 404. At a block 408 the framework 100 gathers supply chain information related to the order processed in the block 404. The supply chain information may be any appropriate contextual information, including the data about the product ordered (e.g., name, model number, brand, compatibility, rating, price, sales discount, etc.), billing information, billing method, shipping information, delivery method, name of user, name of project, customer notes, date of purchase, associated user lists etc. This information may be stored in the data repository 68A, or any other suitable location. For example, data relating to supply-chain based search refinement parameters may be stored in a centralized data repository, and/or such data may be stored locally, on a user's system (i.e. via the user's internet browser history, cookies etc.).

Next at block 410 the framework 100 determines whether the user has additional orders. If the user has additional orders, the data collection process 400 returns to the block 404 to process that order. If the user does not have additional orders the data collection process ends.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

I claim:

1. A non-transient, computer readable media having stored thereon instructions for providing access to a contextual-based search refinement functionality related to a user search within an electronic vendor system, the instructions performing steps comprising:
   receiving from a client computing device data which functions to identify a one of a plurality of system users;
   causing a search access point in which a search term is enterable to be displayed on a display of the client computing device;
   causing the search term entered in the search access point to be submitted to a search engine having an associated data repository to thereby obtain from the search engine a search result wherein the search result is comprised of a plurality of items from within the data repository that have been associated with the search term;
   causing the search result to be displayed on a first portion of the display of the client computing device;
   retrieving from the data repository data representative of each one of a plurality of past purchasing behaviors for the identified one of the plurality of system users corresponding to the plurality of items within the search results;

using the data representative of each one of the plurality of past purchasing behaviors for the identified one of the plurality of system users to create a corresponding plurality of selectable, search result refining, user interface elements;

causing the plurality of selectable, search result refining, user interface elements to be displayed on a second portion of the display of the client computing device, wherein the second portion is adjacent to the first portion of the display; and in response to a selection of a one of the plurality of selectable, search result refining, user interface elements displayed on the second portion of the display of the client computing device, causing the search result displayed on the first portion of the display of the client computing device to be refined whereby only those items from the plurality of items of the search result that have been associated within the data repository with the one of the plurality of past purchasing behaviors for the identified one of the plurality of system users that corresponds to the selected one of the plurality of selectable, search result refining, user interface elements will continue to be displayed on the first portion of the display of the client computing device.

2. The non-transient, computer-readable media as recited in claim 1, wherein the data repository is located on a centralized server.

3. The non-transient, computer-readable media as recited in claim 1, wherein the plurality of past purchasing behaviors for the identified one of the plurality of system users comprises a plurality of payment methods used in association with a plurality of prior purchases of one or more items in the data repository by the identified one of the plurality of system users.

4. The non-transient, computer-readable media as recited in claim 1, wherein the plurality of past purchasing behaviors for the identified one of the plurality of system users comprises a plurality of shipping addresses used in association with a plurality of prior purchases of one or more items in the data repository by the identified one of the plurality of system users.

5. The non-transient, computer-readable media as recited in claim 1, wherein the plurality of past purchasing behaviors for the identified one of the plurality of system users comprises a plurality of billing addresses used in association with a plurality of prior purchases of one or more items in the data repository by the identified one of the plurality of system users.

6. The non-transient, computer-readable media as recited in claim 1, wherein the plurality of past purchasing behaviors for the identified one of the plurality of system users comprises a plurality of order dates used in association with a plurality of prior purchases of one or more items in the data repository by the identified one of the plurality of system users.

* * * * *